United States Patent
Wada

(10) Patent No.: US 7,576,790 B2
(45) Date of Patent: Aug. 18, 2009

(54) TERMINAL CONTROL APPARATUS, TERMINAL CONTROL METHOD, TERMINAL CONTROL PROGRAM AND STORAGE MEDIUM

(75) Inventor: Toshiaki Wada, Tama (JP)

(73) Assignee: Olympus Corporation, Tokyo (JP)

( * ) Notice: Subject to any disclaimer, the term of this patent is extended or adjusted under 35 U.S.C. 154(b) by 765 days.

(21) Appl. No.: 11/004,003

(22) Filed: Dec. 3, 2004

(65) Prior Publication Data

US 2005/0128194 A1 Jun. 16, 2005

(30) Foreign Application Priority Data

Dec. 12, 2003 (JP) ............... 2003-414529

(51) Int. Cl.
*H04N 5/222* (2006.01)
*H04N 5/232* (2006.01)

(52) U.S. Cl. ............... 348/333.02; 348/211.8; 348/211.11

(58) Field of Classification Search ............ 348/211.8, 348/211.5, 211.7, 211.9, 211.11, 211.13, 348/211.14, 211.19, 207.1, 333.02, 333.01, 348/270.99

See application file for complete search history.

(56) References Cited

U.S. PATENT DOCUMENTS

| | | | | |
|---|---|---|---|---|
| 6,144,375 A | * | 11/2000 | Jain et al. | 715/251 |
| 6,483,539 B1 | | 11/2002 | Yamagishi | |
| 6,542,191 B1 | * | 4/2003 | Yonezawa | 348/333.01 |
| 6,567,121 B1 | * | 5/2003 | Kuno | 348/211.3 |
| 6,583,813 B1 | * | 6/2003 | Enright et al. | 348/150 |
| 6,670,984 B1 | * | 12/2003 | Tanaka et al. | 348/159 |
| 6,680,746 B2 | * | 1/2004 | Kawai et al. | 348/211.9 |
| 6,965,399 B1 | * | 11/2005 | Oka et al. | 348/211.99 |
| 2003/0025791 A1 | * | 2/2003 | Kaylor et al. | 348/143 |
| 2003/0043272 A1 | | 3/2003 | Nagao et al. | |

FOREIGN PATENT DOCUMENTS

AU    A-78537/98    2/1999

(Continued)

OTHER PUBLICATIONS

Chinese Office Action to Chinese Patent Application No. 2004100986341, dated Jul. 6, 2007 (5pgs.) with translation (9 pgs.).

(Continued)

*Primary Examiner*—Jason Chan
*Assistant Examiner*—Nicholas G Giles
(74) *Attorney, Agent, or Firm*—Straub & Pokotylo; John C. Pokotylo

(57) ABSTRACT

A control apparatus is connected to at least one terminal device to control the terminal device. The apparatus includes a communication unit which communicates with the terminal device, a display unit which displays an operation window, an information acquisition unit which acquires, from the terminal device through the communication unit, information concerning operation of the terminal device and operation object for operation, an arranging unit which arranges the operation object to produce an operation window and is stored in the control apparatus, and a command generating unit which generates a control command in accordance with operation on an operation window, wherein when the operation object is operated, the command generating unit generates information which specifies the operation object which has been operated and a control command including information concerning an operation amount, and the communication unit transmits the control command to the terminal device.

16 Claims, 9 Drawing Sheets

FOREIGN PATENT DOCUMENTS

| | | |
|---|---|---|
| JP | 04-046496 | 2/1992 |
| JP | 11-317989 | 11/1999 |
| JP | 2000-333269 | 11/2000 |
| JP | 2003-069988 | 3/2003 |

OTHER PUBLICATIONS

Notice of Reasons for Rejection for Japanese Patent Application No. 2003-414529, mailed Mar. 3, 2009 (2 pgs.) (with translation (3 pgs.)).

* cited by examiner

| |
|---|
| Group ID |
| Control ID |
| Control type |
| Object type |
| Object size |
| Aspect ratio resize flag |
| Maximum value |
| Minimum value |
| Minimum change amount |
| |

F I G. 6

TERMINAL CONTROL APPARATUS, TERMINAL CONTROL METHOD, TERMINAL CONTROL PROGRAM AND STORAGE MEDIUM

CROSS-REFERENCE TO RELATED APPLICATIONS

This application is based upon and claims the benefit of priority from prior Japanese Patent Application No. 2003-414529, filed Dec. 12, 2003, the entire contents of which are incorporated herein by reference.

BACKGROUND OF THE INVENTION

1. Field of the Invention

The present invention relates to a technique for remotely controlling a terminal and, more particularly, to a technique for versatilely controlling a terminal.

2. Description of the Related Art

The following methods are generally used to externally control/operate terminal devices such as cameras. In the first method, a terminal device such as a camera is externally controlled/operated through a controller exclusively prepared for the terminal. In the second method, software for controlling a terminal device is operated on a general information processing apparatus such as a personal computer (to be referred to as a "PC" hereinafter) or personal digital assistant (to be referred to as a "PDA" hereinafter) so as to externally control/operate the terminal. In either of the methods, an operation window corresponding to the type of terminal device to be controlled must be displayed on a display.

For this reason, even if control software dedicated to each type of camera or one piece of control software is prepared, a special control window must be prepared in advance for each type of terminal device.

On the other hand, there has been proposed a technique of giving a Web server function to a camera as a terminal device and allowing the camera to generate an operation page for control (Jpn. Pat. Appln. KOKAI Publication No. 2003-69988).

BRIEF SUMMARY OF THE INVENTION

According to a first aspect of the present invention, there is provided a control apparatus which is connected to at least one terminal device to control the terminal device, comprising a communication unit which communicates with the terminal device, a display unit which displays an operation window for controlling the terminal device, an information acquisition unit which acquires, from the terminal device through the communication unit, at least information concerning operation of the terminal device and at least one operation object to be displayed on the display unit for operation, an arranging unit which arranges the operation object to produce an operation window which is displayed on the display unit and is stored in the control apparatus, and a command generating unit which generates a control command for controlling the terminal in accordance with operation on an operation window displayed on the display unit, wherein when the operation object on the operation window is operated, the command generating unit generates at least information which specifies the operation object which has been operated and a control command including information concerning an operation amount of the object, and the communication unit transmits the control command to the terminal device.

According to the first aspect of the present invention, there is provided a control method for a control apparatus which has a communication unit which communicates with at least one terminal device and a display unit which displays information and controls the terminal device, comprising steps of, acquiring, from the terminal device through the communication unit, at least information concerning operation of the terminal device and at least one operation object to be displayed on the display unit for operation, arranging the operation object acquired from the terminal device to produce an operation window which is displayed on the display unit and is stored in the control apparatus, displaying, on the display unit, the operation window for controlling the terminal device, and generating a control command for controlling the terminal in accordance with operation of the operation window for controlling the terminal device which is displayed on the display unit, wherein when the operation object on the operation window is operated, the generated control command includes information which specifies at least the operated operation object and information concerning an operation amount of the object, and the communication unit transmits the control command to the terminal device.

According to the first aspect of the present invention, there is provided a program for a control apparatus which has a communication unit which communicates with at least one terminal device and a display unit which displays information and controls the terminal device, wherein the program is configured for, acquiring, from the terminal device through the communication unit, at least information concerning operation of the terminal device and at least one operation object to be displayed on the display unit for operation, arranging the operation object acquired from the terminal device to produce an operation window which is displayed on the display unit and is stored in the control apparatus, displaying, on the display unit, the arranged operation window for controlling the terminal device, generating a control command for controlling the terminal in accordance with operation of the operation window for controlling the terminal device which is displayed on the display unit, wherein when the operation object on the operation window is operated, the generated control command includes information which specifies at least the operated operation object and information concerning an operation amount of the object, and transmitting the control command to the terminal device.

According to the first aspect of the present invention, there is provided a storage medium which has a communication unit which communicates with at least one terminal device and a display unit which displays information and controls the terminal device, wherein the program is configured for, acquiring, from the terminal device through the communication unit, at least information concerning operation of the terminal device and at least one operation object to be displayed on the display for operation, arranging the operation object acquired from the terminal device to produce an operation window which is displayed on the display unit and is stored in the control apparatus, displaying, on the display unit, the arranged operation window for controlling the terminal device, generating a control command for controlling the terminal in accordance with operation of the operation window for controlling the terminal device which is displayed on the display unit, wherein when the operation object on the operation window is operated, the generated control command includes information which specifies at least the operated operation object and information concerning an operation amount of the object, and transmitting the control command to the terminal device.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 6 is a view showing the contents of object attribute information;

DETAILED DESCRIPTION OF THE INVENTION

An embodiment of the present invention will be described below with reference to the views of the accompanying drawing.

Figure 1:
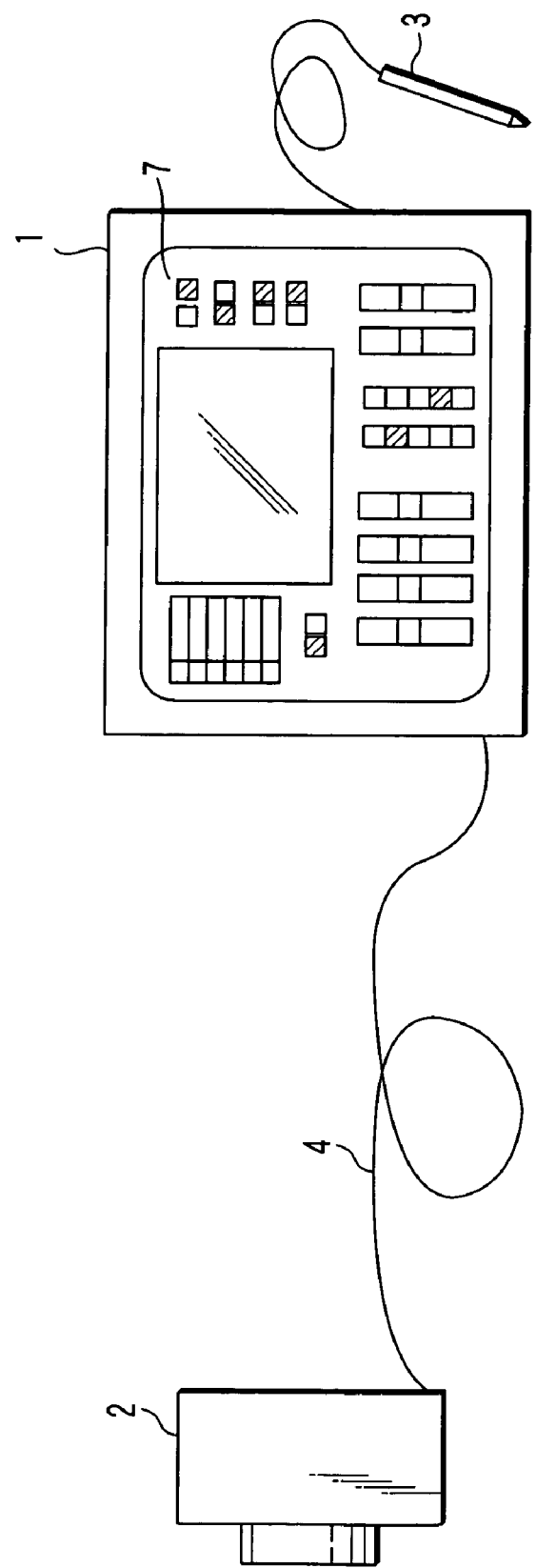
FIG. 1 is a view showing the arrangement of a control system to which a control apparatus according to an embodiment of the present invention is applied.

FIG. 1 is a view showing the arrangement of a control system to which a control apparatus according to an embodiment of the present invention is applied.

This control system is comprised of a control apparatus 1, a terminal 2 which is controlled by the control apparatus 1, an operation device 3 which is used to issue an operation instruction to the control apparatus 1, and a communication line 4 which connects the control apparatus 1 to the terminal 2.

An input/output window 7 provided for the control apparatus 1 displays a control window. On this control window, various kinds of operation buttons and the like which control the terminal 2 are displayed. The control apparatus 1 can accept input operation of the operation device 3 through the control window.

Figure 2:
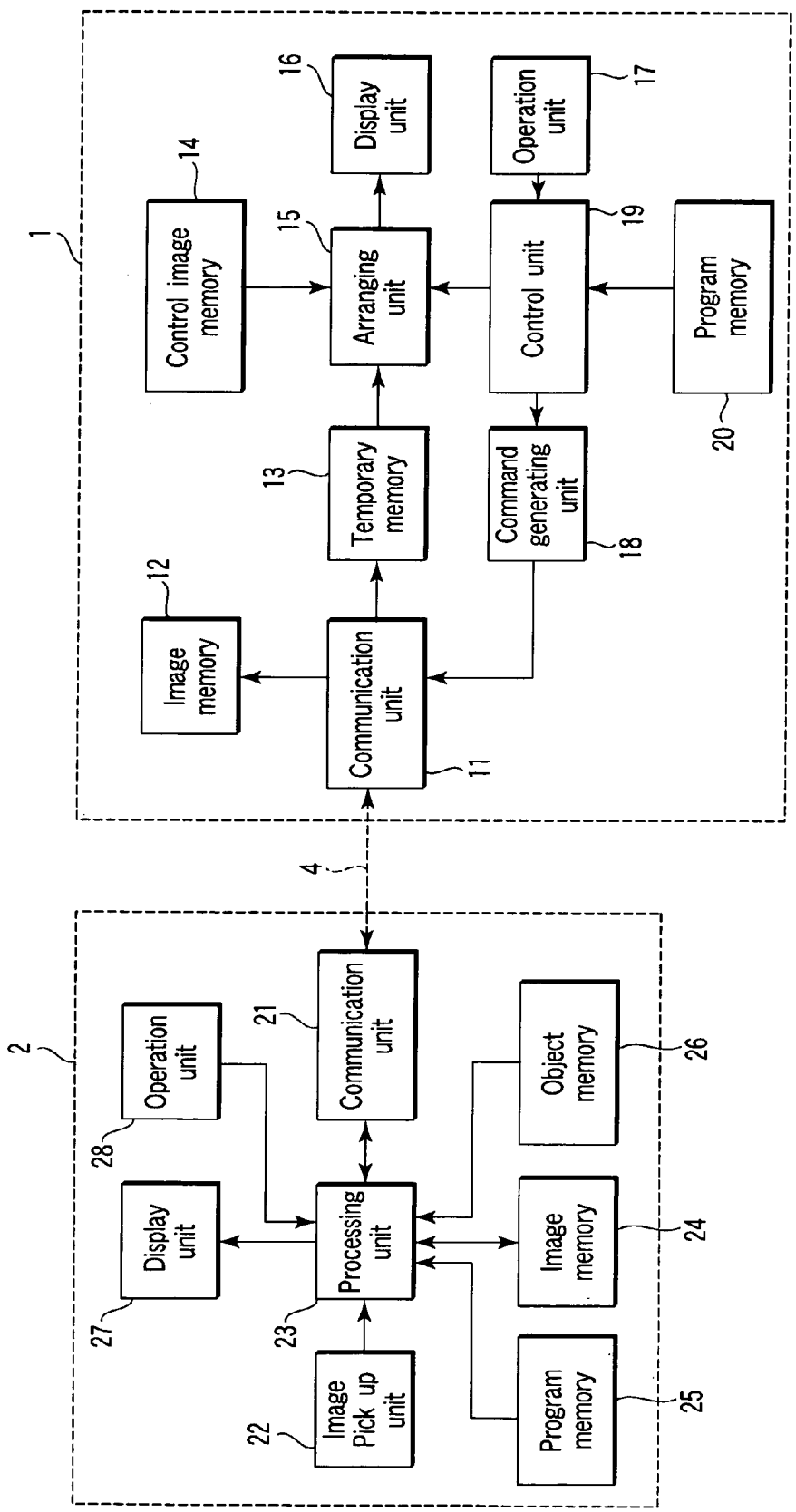
FIG. 2 is a block diagram showing the arrangements of a control apparatus and terminal.

FIG. 2 is a block diagram showing the arrangements of the control apparatus 1 and terminal 2. In this embodiment, a digital camera is used as the terminal 2.

The control apparatus 1 is comprised of a communication unit 11, image memory 12, temporary memory 13, control image memory 14, arranging unit 15, display unit 16, operation unit 17, command generating unit 18, control unit 19, and program memory 20.

The communication unit 11 is an interface for the exchange of various kinds of information with the terminal 2. The image memory 12 stores the image data transmitted from the terminal 2. The temporary memory 13 is a buffer memory which temporarily stores the object data and the like transmitted from the terminal 2. The control image memory 14 stores common window image to be displayed on the display unit 7. The arranging unit 15 forms a control window on the basis of the object data and the like in the temporary memory 13 and the common window image in the control image memory 14. The display unit 16 displays the formed control image on the input/output window 7. The operation unit 17 specifies an operation content from input operation of the operation device 3 on the input/output window 7. The command generating unit 18 generates a transmission command for instructing the terminal 2 on the basis of the, input operation content. The program memory 20 stores a processing program for the control apparatus 1. The control unit 19 systematically controls the operation of each component of the control apparatus described above.

The terminal 2 is comprised of a communication unit 21, image pickup unit 22, processing unit 23, image memory 24, program memory 25, object memory 26, display unit 27, and operation unit 28.

The communication unit 21 is an interface for the exchange of various kinds of information with the control apparatus 1. The image pickup unit 22 acquires an optical image of an object to be imaged and converts it into image data. The processing unit 23 controls image pickup operation of generating an image file from image data and also controls the exchange of image files and object data with the control apparatus 1. The image memory 24 stores the image file processed by the processing unit 23. The program memory 25 stores a processing program for the terminal 2. The object memory 26 stores object data to be displayed on the control apparatus 1. The display unit 27 displays images, imaging information, and the like stored in the terminal 2. The operation unit 28 receives an operation instruction input from a user and outputs it to the processing unit 23.

Note that the communication line 4 is a path generally used for the transmission/reception of information. Communication using the communication line 4 is not limited to communication using a wire such as a conductive line or optical fiber, and includes wireless communication using light, sound waves, radio waves, or the like.

In the control apparatus 1 according to this embodiment, the user inputs an operation instruction for operating the terminal 2 on the basis of the control window displayed on the input/output window 7 of the control apparatus 1.

Figure 3:
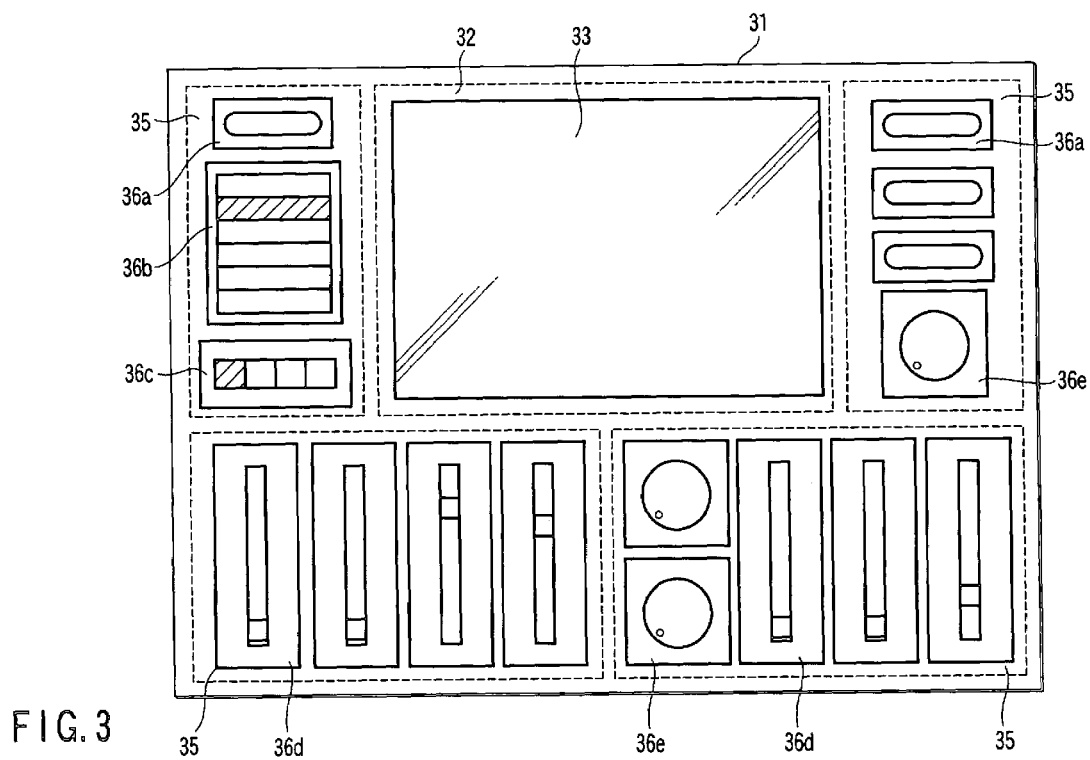
FIG. 3 is a view showing the arrangement of a control window.

FIG. 3 is a view showing an example of the arrangement of a control window 31.

The control window 31 is comprised of a display area 32 and control group areas 35. The display area 32 is provided with a preview window 33 for displaying the image data, imaging information, and the like transmitted from the terminal 2. Each control group area 35 is provided with various kinds of operation buttons. In the control group area 35, the operation functions of the terminal 2 are classified into groups. When, for example, a digital camera is used as the terminal 2, the operation functions can be classified into the following groups:

A. an imaging control group: a group of control operations associated with imaging, e.g., a shutter speed and exposure;

B. a storage control group: a group of control operations associated with image storage, e.g., a file format and compression ratio;

C. a camera setting control group: a group of control operations for various settings of the camera, e.g., clock adjustment and menu display format change; and D. a special imaging effect control group: a group of control operations for special effects, e.g., writing of an imaging date on an image and a composite picture function.

In each control group area 35 shown in FIG. 3, control objects 36 representing various kinds of operation buttons are displayed. The control objects 36 include an ON/OFF button 36a, selection buttons 36b and 36c, slider operating unit 36d, volume dial 36e, and the like.

Figure 4:
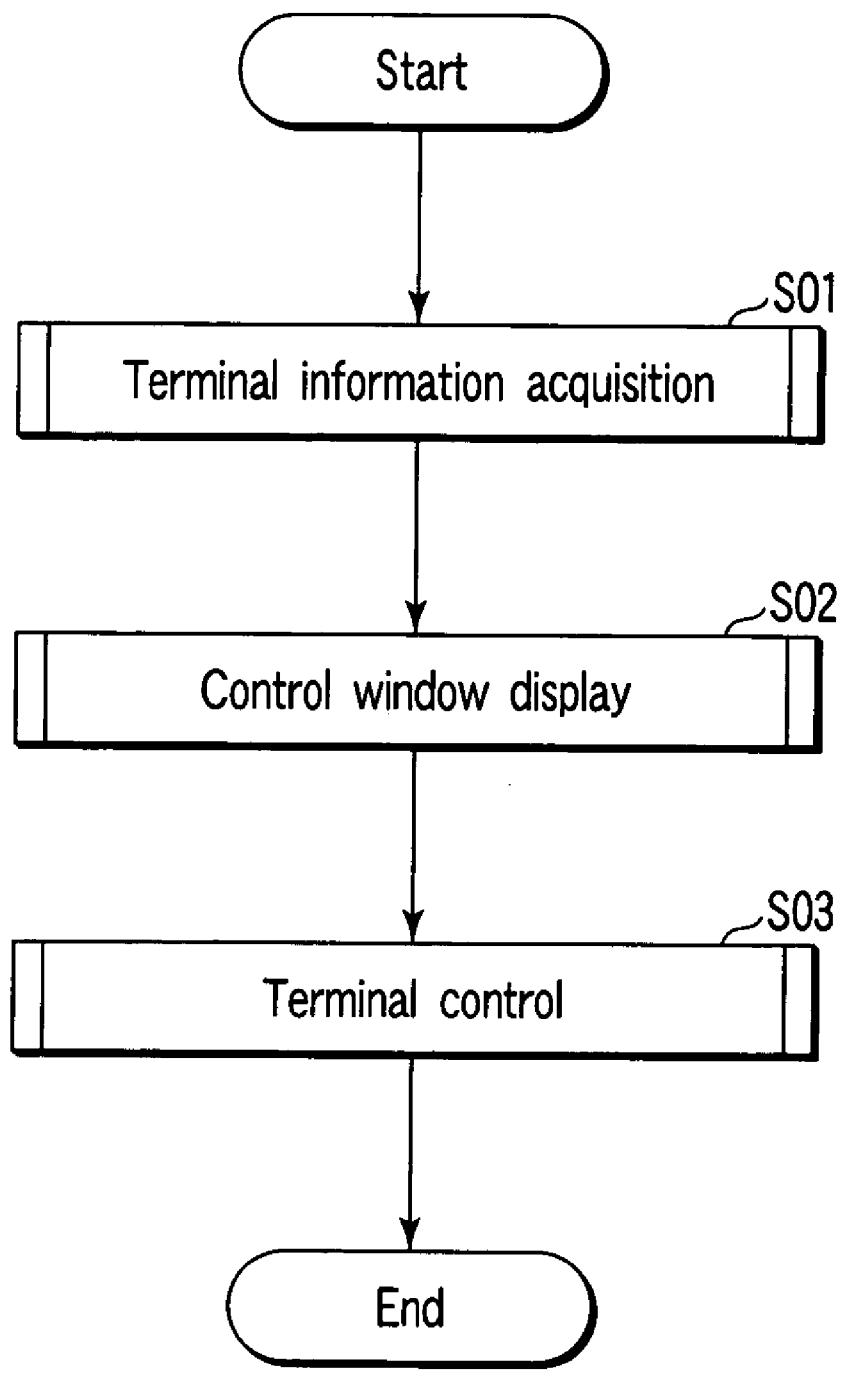
FIG. 4 is a flowchart schematically showing a control sequence in the control apparatus.

FIG. 4 is a flowchart schematically showing a control sequence in the control apparatus 1.

Figure 5:
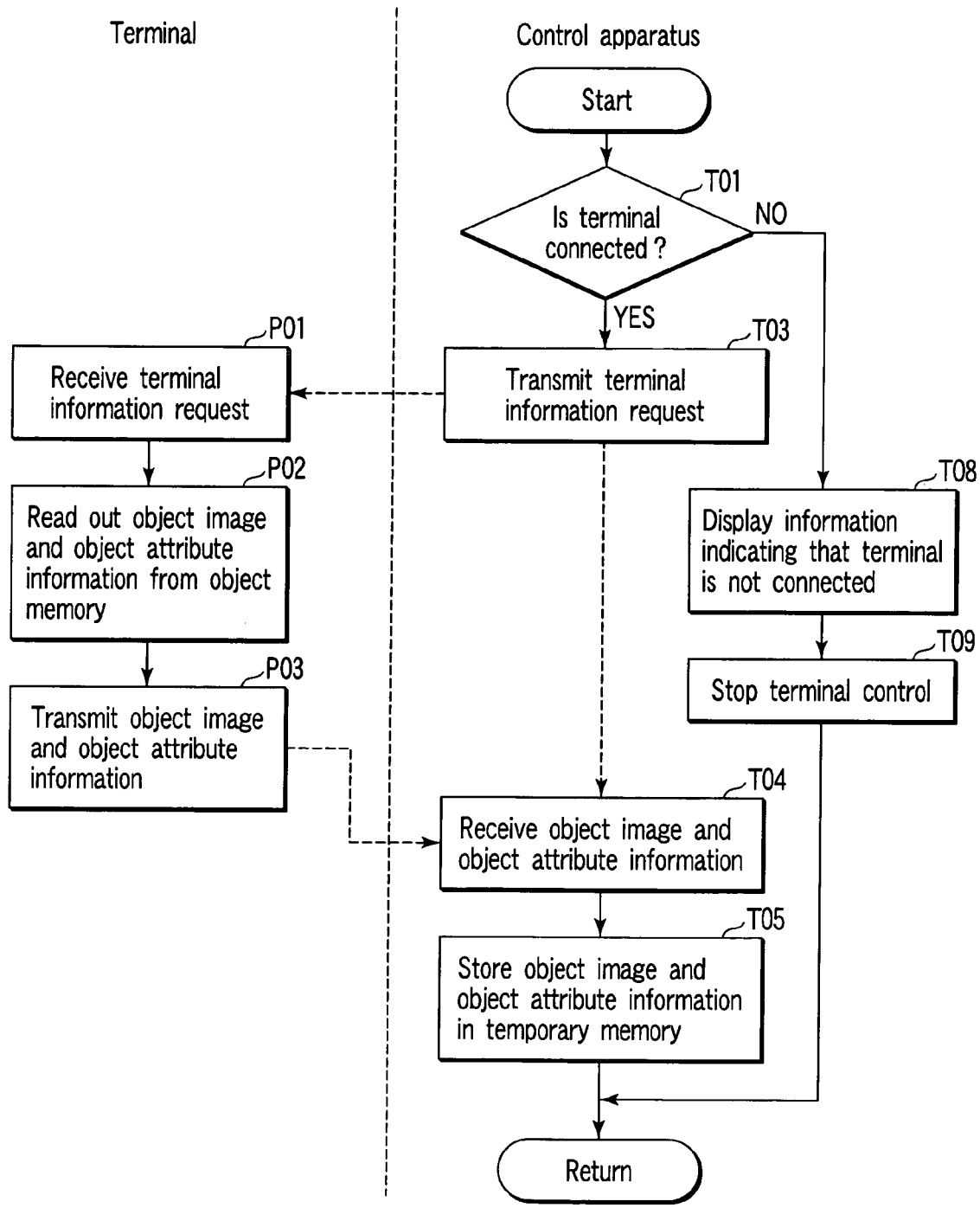
FIG. 5 is a flowchart schematically showing terminal information acquisition processing.

In step S01, the control unit 19 of the control apparatus 1 executes terminal information acquisition processing. FIG. 5 shows this terminal information acquisition processing.

In step T01 in FIG. 5, the control unit 19 checks whether the terminal 2 is connected. If YES in step T01, i.e., the terminal 2 is connected, the control unit 19 transmits a terminal information request to the terminal 2 through the communication unit 11 in step T03.

In steps P01 to P03, the processing unit 23, which has received the terminal information request through the communication unit 21, reads out an object image and object attribute information from the object memory 26, and transmits them to the control apparatus.

In this case, the object image is the image data of the control object 36 displayed on the control window 31.

In addition, the object attribute information is information which designates, for example, which control object 36 is to be placed in which control group area 35 in what size.

FIG. 6 is a view showing the contents of object attribute information.

"Group ID" is information which specifies the control group area 35 in the control window. "Control ID" is information which specifies the control object 36 in the control group area 35. "Control type" designates an operation input format. For example, this information designates one of an ON/OFF value, selection value, and continuous value with which input operation is to be performed. "Object type" designates the form of the control object 36. For example, this information designates one of the forms denoted by reference numerals 36a to 36e in FIG. 3.

"Object size" designates the size of the control object 36 on the control window. "Aspect ratio resize flag" represents whether or not the aspect ratio of the control object 36 can be changed. "Aspect ratio resize flag" is used in, for example, the following case. Since no problem arises when the aspect ratio of the slider operating unit 36d is changed, a flag representing the permission of change is set. When the aspect ratio of the volume dial 36e is changed an elliptic shape appears. In this case, therefore, a flag representing the inhibition of change is set. "Maximum value", "minimum value", and "minimum change amount" represent a controllable range and minimum resolution in the continuous value input mode. The object attribute information also includes information which defines the movement of the control object 36, e.g., linear motion, pivoting motion, continuous motion, and intermittent motion.

Referring back to FIG. 5, in steps T04 and T05, the control unit 19 receives the object image and object attribute information and stores them in the temporary memory 13. The flow then returns to the main routine.

In step T01 in FIG. 5, the control unit 19 causes the command generating unit 18 to generate a command for checking the connected state of the terminal 2, and transmits the command to the terminal 2 through the communication unit 11 to check whether or not the terminal 2 is connected. If NO in step T01, i.e., the terminal 2 is not connected, information indicating that the terminal 2 is not connected is displayed on the input/output window 7, and terminal control is stopped in steps T08 and T09. The flow then returns to the main routine.

Figure 7:
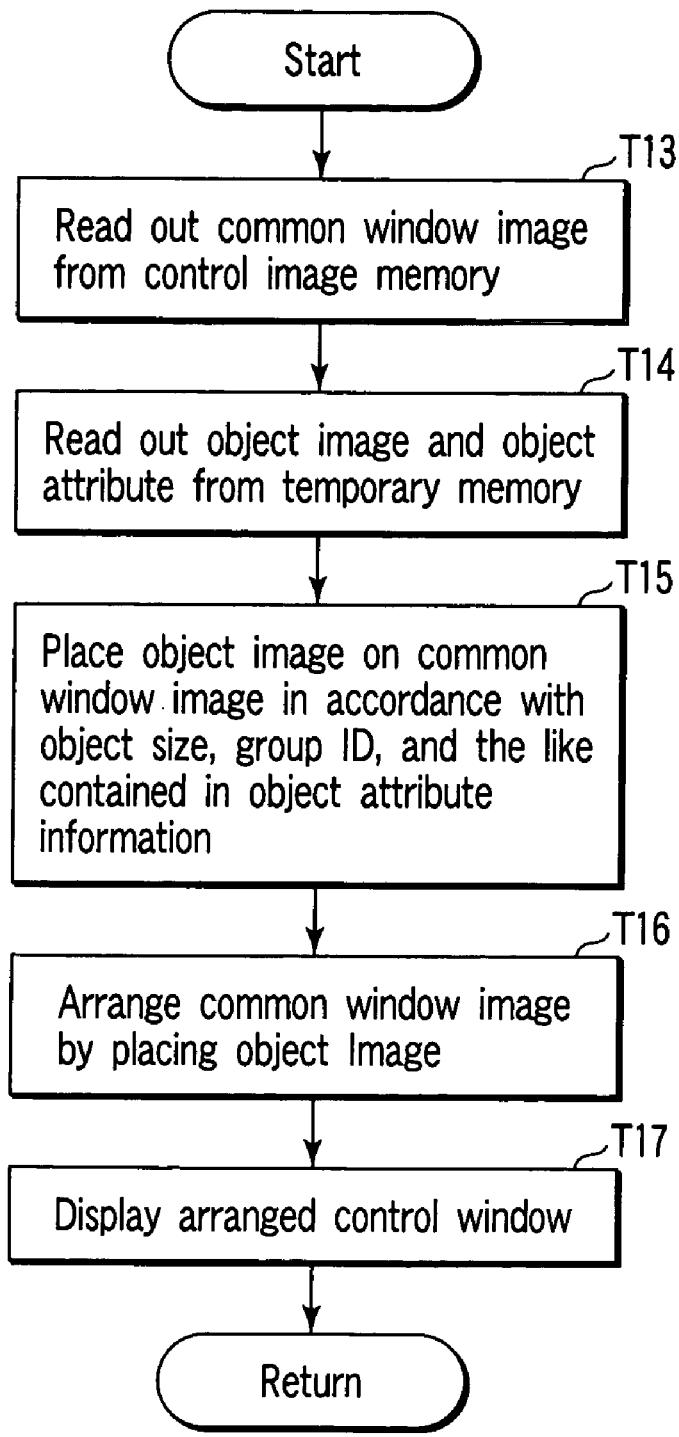
FIG. 7 is a flowchart schematically showing control window display processing.

Referring back to FIG. 4, in step S02, the control unit 19 executes control window display processing. FIG. 7 shows the control window display processing.

In steps T13 and T14 in FIG. 7, the control unit 19 reads out a common window image from the control image memory 14, and also reads out object image and object attribute information from the temporary memory 13. In steps T15 and T16, the arranging unit 15 places the object image on the common window image and arranges the common window image and the object image placed thereon in accordance with the object size and group ID contained in the object attribute information. In step T17, the display unit 16 displays the control window generated by arranging them in the input/output window 7. The flow then returns to the main routine.

Figure 8:
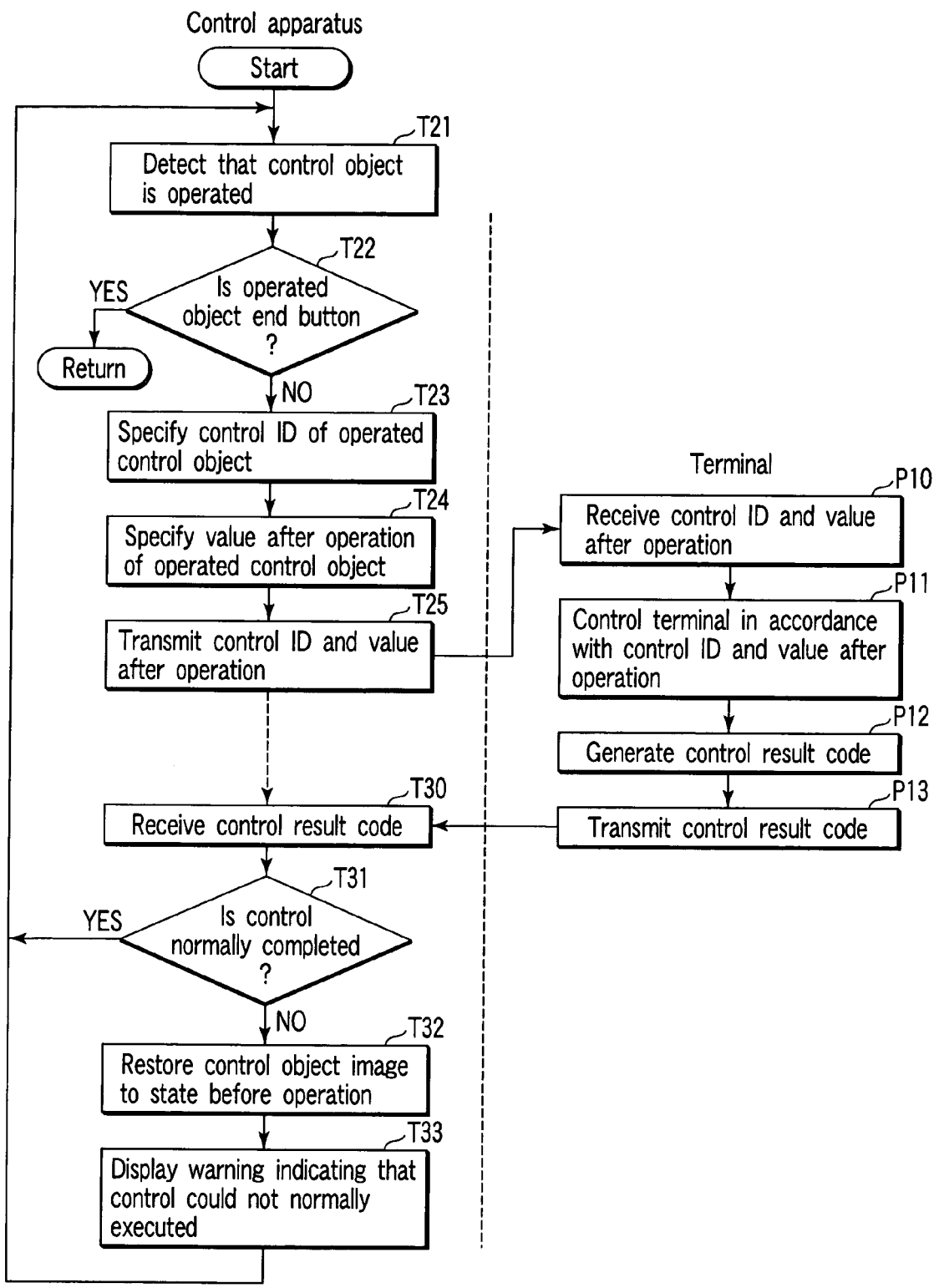
FIG. 8 is a flowchart schematically showing terminal control processing.

Referring back to FIG. 4, when the user operates one of the control objects 36 by using the operation device 3 on the control window, the control unit 19 executes terminal control processing in step S03. FIG. 8 shows the terminal control processing.

In steps T21 and T22 in FIG. 8, upon detecting, on the basis of operation information from the operation unit 17, that one of the control objects 36 has been operated, the control unit 19 specifies the operated control object 36.

In steps T23 to T25, the control ID of the operated control object 36 and a value after the operation are specified, and the specified values are transmitted, together with the command generated by the command generating unit 18, to the terminal 2.

In steps P10 and P11, upon receiving the control ID and the value after the operation, the processing unit 23 controls the operation of a predetermined portion of the terminal 2 in accordance with the values. In steps P12 and P13, a control result code representing whether or not the control is normally performed is generated. This control result code is then transmitted to the control apparatus 1.

In step T30, the control unit 19 of the control apparatus 1 checks the received control result code. If YES in step T31, i.e., the control is normally completed, the flow waits until one of the control objects 36 is operated next.

If NO in step T31, i.e., the control is not normally completed, the control object image is restored to the state before the operation, and a warning indicating that the terminal 2 has not been normally controlled is displayed in steps T32 and T33. The flow then waits until one of the control objects 36 is operated.

If YES in step T22, i.e., the end button is operated, the terminal control processing is terminated, and the flow returns to the main routine.

According to this embodiment described above, the terminal stores operation object data, and the control software for the control apparatus generates a control window by loading the object data. Even if, therefore, the control apparatus does not have control software dedicated to the terminal, the apparatus can provide an operation window dedicated to each terminal. In addition, a terminal which will be developed in the future can also be controlled.

In the above embodiment, the control apparatus is connected to one terminal to control the terminal. However, the present invention is not limited to this. The control apparatus may be connected to a plurality of terminals to control the terminals.

Figure 9:
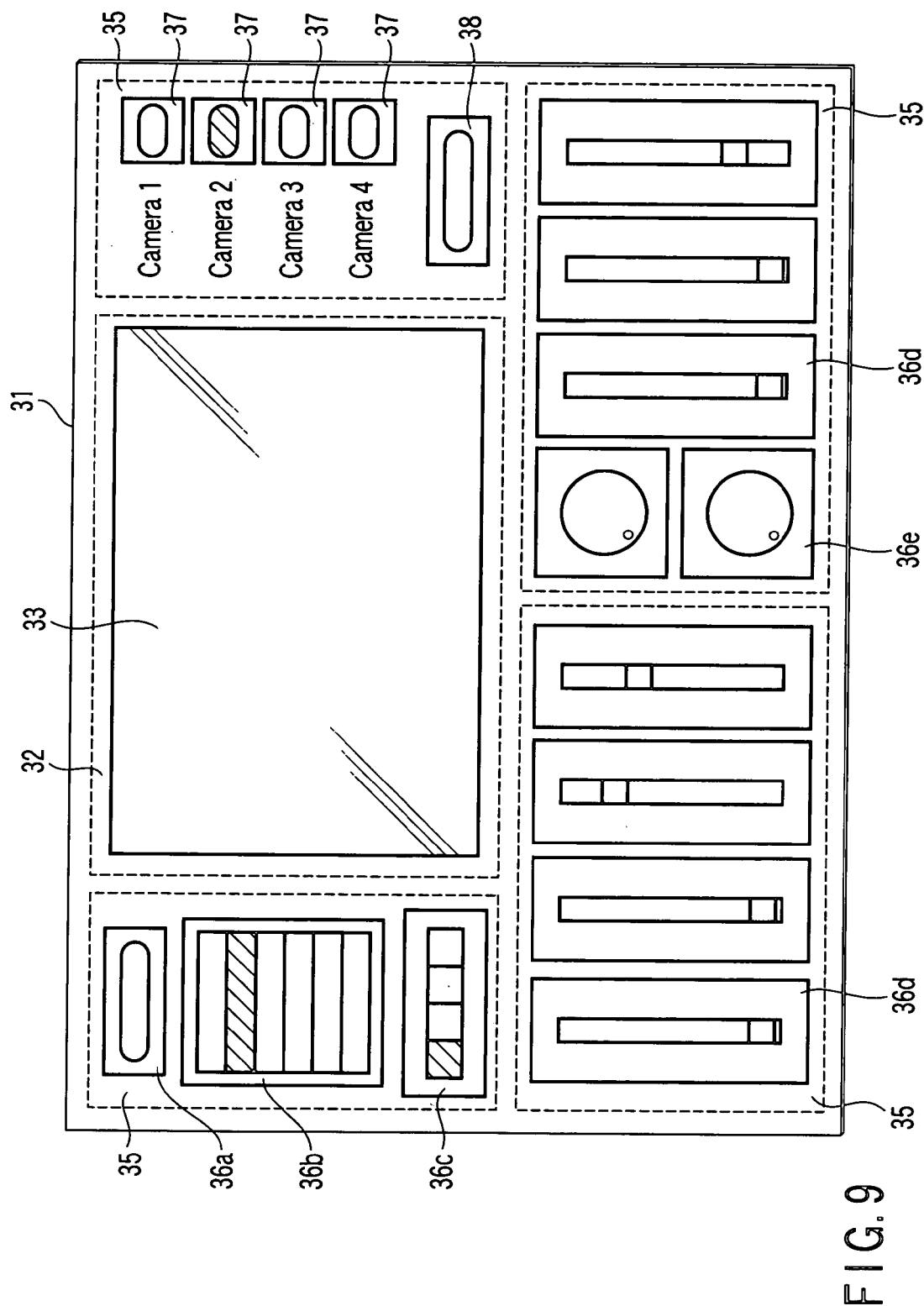
FIG. 9 is a view showing the arrangement of a control window.

FIG. 9 is a view showing the arrangement of a control window in a case wherein the control apparatus is connected to a plurality of terminals.

In the control group area 35 provided on the upper right portion of FIG. 9, camera selection buttons 37 for selecting cameras as terminals and a shutter button 38 for camera operation are provided. When the user selects a specific camera with the cameral selection button 37, the control apparatus 1 executes the above control operation for the selected camera. At this time, different control objects 36 are arranged in the control group areas 35 on the control window 31 in accordance with the kind of camera selected.

According to this arrangement, the operation of a plurality of terminals can be controlled while the above effects are held.

Each function described in the above embodiment may be implemented by hardware or implemented by making a computer load a program describing each function by using software. In addition, each function may be implemented by properly selecting either software or hardware.

In addition, each function can be implemented by making a computer load a program stored in a recording medium (not shown). In this case, the storage medium in this embodiment may take any storage format as long as it is a computer-readable storage medium on which programs can be recorded.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A control apparatus which is connected to at least one terminal device to control the terminal device, comprising:
    a communication unit which communicates with the terminal device;
    a display unit which displays an operation window for controlling the terminal device;
    an information acquisition unit which acquires, from the terminal device through the communication unit, at least information concerning operation of the terminal device and at least one operation object to be displayed on the display unit for operation;
    an arranging unit which arranges the operation object to produce an operation window which is displayed on the display unit and is stored in the control apparatus; and
    a command generating unit which generates a control command for controlling the terminal in accordance with operation on an operation window displayed on the display unit,
    wherein when the operation object on the operation window is operated, the command generating unit generates at least information which specifies the operation object which has been operated and a control command including information concerning an operation amount of the object, and the communication unit transmits the control command to the terminal device,
    wherein the operation object is image data of a control object to be displayed on the operation window, and
    wherein the information concerning operation of the terminal device includes information that designates (A) which area of the operation window the control object is to be placed and (B) the size of the control object.

2. An apparatus according to claim 1, wherein the information concerning the operation of the terminal device which is acquired by the information acquisition unit includes information which defines operation of the operation object.

3. The apparatus according to claim 1,
    wherein, at a first time, the information acquisition unit acquires information concerning operation of a first terminal device and a first set of at least one operation object, and the arranging unit arranges the first set of at least one operation object to produce a first operation window,
    wherein, at a second time, the information acquisition unit acquires information concerning operation of a second terminal device and a second set of at least one operation object, and the arranging unit arranges the second set of at least one operation object to produce a second operation window,
    wherein the first set of at least one operation object is different from the second set of at least one operation object, and
    wherein the first operation window is different from the second operation window.

4. An apparatus according to claim 2, wherein the information concerning the operation of the terminal device which is acquired by the information acquisition unit includes information which specifies a group to which a target for the operation belongs, and
    the arranging unit places the operation object on the operation window in accordance with the group.

5. An apparatus according to claim 4, wherein
    the terminal device is a camera, and
    the operation object includes an object which instructs the camera to perform image pickup operation.

6. The apparatus according to claim 4, wherein the terminal device is a digital camera and wherein the group to which the target for the operation belongs is associated with control operations to control digital imaging effects.

7. The apparatus according to claim 4, wherein the terminal device is a digital camera and wherein the group to which the target for the operation belongs is associated with control operations to control digital image storage.

8. The apparatus according to claim 4, wherein the terminal device is a digital camera and wherein the group to which the target for the operation belongs is associated with control operations to control digital camera settings.

9. A control method for a control apparatus which has a communication unit which communicates with at least one terminal device and a display unit which displays information and controls the terminal device, comprising steps of:
    acquiring, from the terminal device through the communication unit, at least information concerning operation of the terminal device and at least one operation object to be displayed on the display unit for operation;
    arranging the operation object acquired from the terminal device to produce an operation window which is displayed on the display unit and is stored in the control apparatus;
    displaying, on the display unit, the operation window for controlling the terminal device; and
    generating a control command for controlling the terminal in accordance with operation of the operation window for controlling the terminal device which is displayed on the display unit,
    wherein when the operation object on the operation window is operated, the generated control command includes information which specifies at least the operated operation object and information concerning an operation amount of the object, and
    the communication unit transmits the control command to the terminal device, wherein the operation object is image data of a control object to be displayed on the operation window, and wherein the information concerning operation of the terminal device includes information that designates (A) which area of the operation window the control object is to be placed and (B) the size of the control object.

10. A method according to claim 9, wherein the information concerning the operation of the terminal device which is acquired from the terminal device through the communication unit includes information which defines operation of the operation object.

11. A method according to claim 10, wherein the information concerning the operation of the terminal device which is acquired from the terminal device includes information which specifies a group to which a target for the operation belongs, and the operation object is placed on the operation window in accordance with the group.

12. A method according to claim 11, wherein
the terminal device is a camera, and
the operation object includes an object which instructs the camera to perform image pickup operation.

13. A computer-readable storage medium which stores program instructions for a control apparatus, the control apparatus having:

a control unit;

a communication unit which communicates with at least one terminal device; and a display unit which displays information and controls the terminal device, wherein the program instructions, when executed by the control unit, performs a method including:

acquiring, from the terminal device through the communication unit, at least information concerning operation of the terminal device and at least one operation object to be displayed on the display for operation;

arranging the operation object acquired from the terminal device to produce an operation window which is displayed on the display unit and is stored in the control apparatus;

displaying, on the display unit, the arranged operation window for controlling the terminal device;

generating a control command for controlling the terminal in accordance with operation of the operation window for controlling the terminal device which is displayed on the display unit, wherein when the operation object on the operation window is operated, the generated control command includes information which specifies at least the operated operation object and information concerning an operation amount of the object; and transmitting the control command to the terminal device, wherein the operation object is image data of a control object to be displayed on the operation window, and wherein the information concerning operation of the terminal device includes information that designates (A) which area of the operation window the control object is to be placed and (B) the size of the control object.

14. A computer-readable medium according to claim 13, wherein the information concerning the operation of the terminal device which is acquired from the terminal device through the communication unit includes information which defines operation of the operation object.

15. A computer-readable medium according to claim 14, wherein the information concerning the operation of the terminal device which is acquired from the terminal device includes information which specifies a group to which a target for the operation belongs, and wherein the program instructions, when executed by the control unit, performs the method further including placing the operation object on the operation window in accordance with the group.

16. A computer-readable medium according to claim 15, wherein the terminal device is a camera, and
the operation object includes an object which instructs the camera to perform image pickup operation.

* * * * *